US008488685B2

(12) United States Patent
Maillard et al.

(10) Patent No.: US 8,488,685 B2
(45) Date of Patent: Jul. 16, 2013

(54) ACTIVE BIDIRECTIONAL SPLITTER FOR SINGLE ENDED MEDIA

(75) Inventors: Xavier Maillard, Beert (BE); Maarten Kuijk, Antwerp (BE)

(73) Assignee: Eqcologic NV, Etterbeek (BE)

( * ) Notice: Subject to any disclaimer, the term of this patent is extended or adjusted under 35 U.S.C. 154(b) by 441 days.

(21) Appl. No.: 12/748,654

(22) Filed: Mar. 29, 2010

(65) Prior Publication Data

US 2010/0246647 A1 Sep. 30, 2010

(30) Foreign Application Priority Data

Mar. 31, 2009 (EP) .................................... 09157045

(51) Int. Cl.
*H04B 3/00* (2006.01)
(52) U.S. Cl.
USPC ......................................................... 375/257
(58) Field of Classification Search
USPC ................. 375/257, 316; 326/82, 86
See application file for complete search history.

(56) References Cited

U.S. PATENT DOCUMENTS

| 6,426,970 | B1 | 7/2002 | Thornton et al. | |
|---|---|---|---|---|
| 2002/0149402 | A1 | 10/2002 | Martin et al. | |
| 2002/0169994 | A1* | 11/2002 | Yang ............................ | 713/503 |
| 2003/0067325 | A1* | 4/2003 | Haycock et al. ................ | 326/82 |
| 2003/0123570 | A1 | 7/2003 | Cecchi et al. | |
| 2003/0197528 | A1* | 10/2003 | Shibata et al. .................. | 326/86 |

OTHER PUBLICATIONS

Search Report of EPO regarding European Patent Application No. 09157045.7, Oct. 2, 2009.

* cited by examiner

*Primary Examiner* — Jaison Joseph
(74) *Attorney, Agent, or Firm* — Bacon & Thomas, PLLC (57) ABSTRACT

An active bidirectional splitter (212) for transmission and reception of data signals over a single ended transmission medium (105) comprises an input port (150), an output port (152) and a differential combined input/output port (151), a first differential output driver (115) for receiving an input signal (144) from the input port (150) and transmitting this signal to the differential input/output port (151), a second differential output driver (116) for receiving the input signal (144) from the input port (150), a first averaging circuit (121) for averaging the differential signal (146, 147) at the differential input/output port (151), a second averaging circuit (120) for averaging the differential signal (144, 145) at the output of the second differential output driver (116), and a receiver (117) for receiving both averaged signals (118, 119) from the first averaging circuit (121) and the second averaging circuit (120) and for generating therefrom an output signal on the output port (152).

15 Claims, 5 Drawing Sheets

ACTIVE BIDIRECTIONAL SPLITTER FOR SINGLE ENDED MEDIA

FIELD OF THE INVENTION

The present invention relates to an active splitter for full-duplex bidirectional communication over single ended physical media, including coaxial and non coaxial cables, having increased splitter performance and operable without common mode choke.

BACKGROUND OF THE INVENTION

At present, most high speed (1 Gbps or more) electrical communication over cables is done through differential cables. Differential communication is considered as the best way to achieve sufficient Electro Magnetic Compatibility (EMC), being low radiative emissions at the transmit side and good bulk current immunity at the receive side. Many examples of commercialized technologies exist, like USB (Universal Serial Bus), HDMI (High Definition Multimedia Interface), DisplayPort, Serial ATA (Advanced Technology Attachment), etc . . . based on differential signaling. However, differential connectors and cables are more expensive than single ended coaxial and non-coaxial cables and connectors. Furthermore, at high bit rate, differential cables often generate intra-pair skew. This leads to wave coupling in the cable between differential and common modes, and to final destruction of the transmitted signals. Skew compensation circuits can only compensate very limited skew at receiver's end due to the destructive effect of the coupling. A single ended cable like a coaxial cable (or coax) cannot have any skew problems due to its single ended nature.

Another merit of single ended cabling systems is their relatively well-known characteristic impedance. E.g. one can easily find on the market an RG174 coaxial cable with a 50Ω impedance having a tolerance of +/−2Ω, whilst for a differential system, a typical specification is 100Ω impedance with a tolerance of +/−10Ω. This higher relative uncertainty on the characteristic impedance makes a differential cable a less attractive candidate for bidirectional communication.

U.S. Pat. No. 6,426,970B1 shows an active bidirectional splitter for communication over a common coaxial cable and also many other prior art circuits using transformers and chokes. It does not show how to get enough splitter separation or how to integrate a cable equalizer without these magnetic elements. At high bit rate, e.g. over 2 Gbps, magnetic components are hard to make, and thus expensive. On-chip transformers and/or common mode chokes achieve high quality at many GigaHertz, however they do not show wideband operation due to the limited numbers of turns that are achievable on-chip. As such they do not provide a operable solution for many types of signal communication, including NRZ (non-return to zero) and PAM (pulse amplitude modulation) communication. Having a high level of splitter separation, allows to use bidirectional communication including equalizer receiver functions for compensating frequency dependent losses in the cable. In this way, bidirectional communication over a single coaxial cable becomes possible in a full duplex mode using extended cable lengths and/or at higher bitrates.

US2003/123570 describes a receiver capable of receiving signals in simultaneous bi-directional current mode differential links. The receiver comprises a resistor-summing network coupled to the outputs of a data driver and to the outputs of a replica driver. One portion of the resistor network outputs an average voltage of the positive phase of the reference driver and the negative phase of the data driver. A second portion of the resistor-summing network outputs an average voltage of the negative phase of the reference driver and the positive phase of the data driver. The two outputs of the resistor network are coupled to the inputs of a differential amplifier. The output of the amplifier is the data sent by the remote data driver. It is a disadvantage of such receiver that common mode signals are not cancelled out.

US2002/149402 describes a simultaneous bidirections data port circuit including a current mode output driver for driving an output node and a current mode return driver for driving a differential receiver. Each driver is divided into driver segments. Some driver segments are driven by outbound data, and other driver segments are driven by pre-equalization data.

SUMMARY OF THE INVENTION

In a first aspect, the present invention provides an active bidirectional splitter for transmission and reception of data signals over a single ended transmission medium utilizing a common path for both transmission and reception. The active bidirectional splitter comprises an input port, an output port and a differential combined input/output port, a first differential output driver for receiving an input signal from the input port and transmitting this signal to the differential input/output port, a second differential output driver for receiving the input signal from the input port, a first averaging circuit for averaging the differential signal at the differential input/output port, a second averaging circuit for averaging the differential signal at the output of the second differential output driver, and a receiver for receiving both averaged signals from the first averaging circuit and the second averaging circuit and for generating therefrom an output signal on the output port.

It is an advantage of a bidirectional splitter according to embodiments of the present invention that good splitting properties are obtained, without slow and/or expensive components. Hence the bidirectional splitter according to embodiments of the present invention may be used at high data rates, e.g. 1 Gbps or higher.

In an active bidirectional splitter according to embodiments of the present invention the second differential output driver may be end terminated by a termination circuit. The termination circuit may be adapted for compensating for an impedance mismatch at the level where the single ended transmission medium is attached to the bidirectional splitter, e.g. at the level of a coax connector. In order to obtain this impedance mismatch compensation, the termination circuit may comprise a variable resistor. Alternatively or on top thereof, the end termination circuit may comprise a variable capacitor, for taking care of a capacitive imbalance at the level where the single ended transmission medium is attached to the bidirectional splitter, e.g. at the level of the coax connector. Alternatively or on top thereof, the termination circuit may be adapted for compensating for packaging parasitics. In order to obtain this compensation, the end termination circuit may comprise at least one inductance corresponding to the parasitic inductance generated by the packaging.

In embodiments of the present invention, the end termination circuit may be implemented on chip with the active bidirectional splitter. In alternative embodiments, the bidirectional splitter may be provided on a chip, and the termination circuit may be provided off-chip.

In embodiments of the present invention, the differential input/output port may have a first connection or pin and a second connection or pin, the first connection being terminated to a shield of the single ended transmission medium through a termination resistor, and the second connection being connected to an inner core of the single ended transmission medium.

For energy reasons, the second differential output driver may be a downscaled version of the first differential output driver. For example, when the first differential output driver and the second differential output driver are being terminated, the termination of the second differential output driver may be a downscaled version of the termination of the first differential output driver.

The first averaging circuit and/or the second averaging circuit may comprise two impedances having a same impedance value and being connected in series, the average being obtained at a node between the two impedances.

In a second aspect, the present invention provides a method for active bidirectional splitting of data signals transmitted and received over a common single ended transmission medium. The method comprises receiving at a first differential output driver a differential input signal and transmitting this signal to a differential input/output port, receiving at a second differential output driver the differential input signal, receiving at a differential input/output port a data signal transmitted over the common single ended transmission medium, averaging the differential signal at the differential input/output port, averaging the differential signal at the output of the second differential output driver, and receiving both averaged signals and therefrom generating a differential output signal on a differential output port.

A method according to embodiments of the present invention may further comprise end terminating the second differential output driver. Terminating the second differential output driver may comprise using a termination circuit adapted for compensating for an impedance mismatch at the level where the single ended transmission medium is connected to a bidirectional splitter. Alternatively or on top thereof, terminating the second differential output driver may comprise using a termination circuit adapted for taking care of a capacitive imbalance at the level where the single ended transmission medium is connected to a bidirectional splitter. On top thereof or alternatively, terminating the second differential output driver may comprise compensating for packaging parasitics.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

In the different figures, the same reference signs refer to the same or analogous elements.

DETAILED DESCRIPTION OF ILLUSTRATIVE EMBODIMENTS

The present invention will now be described with respect to particular embodiments and with reference to certain drawings, but the invention is not limited thereto, but is only limited by the claims. The drawings described are only schematic and are non-limiting. In the drawings, the size of some of the elements may be exaggerated and not drawn on scale for illustrative purposes. The dimensions and relative dimensions do not necessarily correspond to actual reductions to practice of the invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The invention will now be described by a detailed description of several embodiments of the invention. It is clear that other embodiments of the invention can be configured according to the knowledge of persons skilled in the art without departing from the technical teaching of the invention as defined by the appended claims.

The present invention relates to devices for coupling both a transmitter and a receiver to a single communication medium. These devices are called bidirectional splitters. An active bidirectional splitter is a bidirectional splitter where active electronic components are included.

In a typical bidirectional communication system, a transmitter and a receiver operate simultaneously and at the same or different frequency for sending and receiving signals, respectively, over the common medium, e.g. a coaxial cable. Signals are only differentiated by the direction in which the respective signals are proceeding. A first bidirectional splitter couples a first transmitter and a first receiver to the common communication medium at one end, and a second bidirectional splitter couples a second transmitter and a second receiver to the common communication medium at the other end.

In the prior art, magnetic components are used, like a common mode choke for achieving acceptable splitter performance. However, common mode chokes and transformers have limited high speed performance, they typically stop to operate at 1 GHz. Further, they are costly elements. The present invention allows a bidirectional splitter to operate without these costly common mode chokes or transformers, and at frequencies limited by the electronics, and not by the use of magnetic components. Further an integral solution for cancelling the unbalance at the level of the connector by the use of tunable resistors and capacitors is provided.

The operation of the active bidirectional splitter circuits according to embodiments of the present invention is demonstrated for digital signaling, for the sake of keeping the explanations simple. Multiple level signaling, and, analogue signaling can benefit from the present invention in the same way using same or similar measures.

Single-ended signaling is the simplest commonly used method of transmitting electrical signals over wires. One wire carries a varying voltage that represents the signal, while the other wire is connected to a reference voltage, usually ground. This method is the most common means of sending signals down wires. The main alternative to single-ended signaling is called differential signaling. Differential signaling is a method of transmitting information electrically by means of two complementary signals sent on two separate wires.

Figure 1:
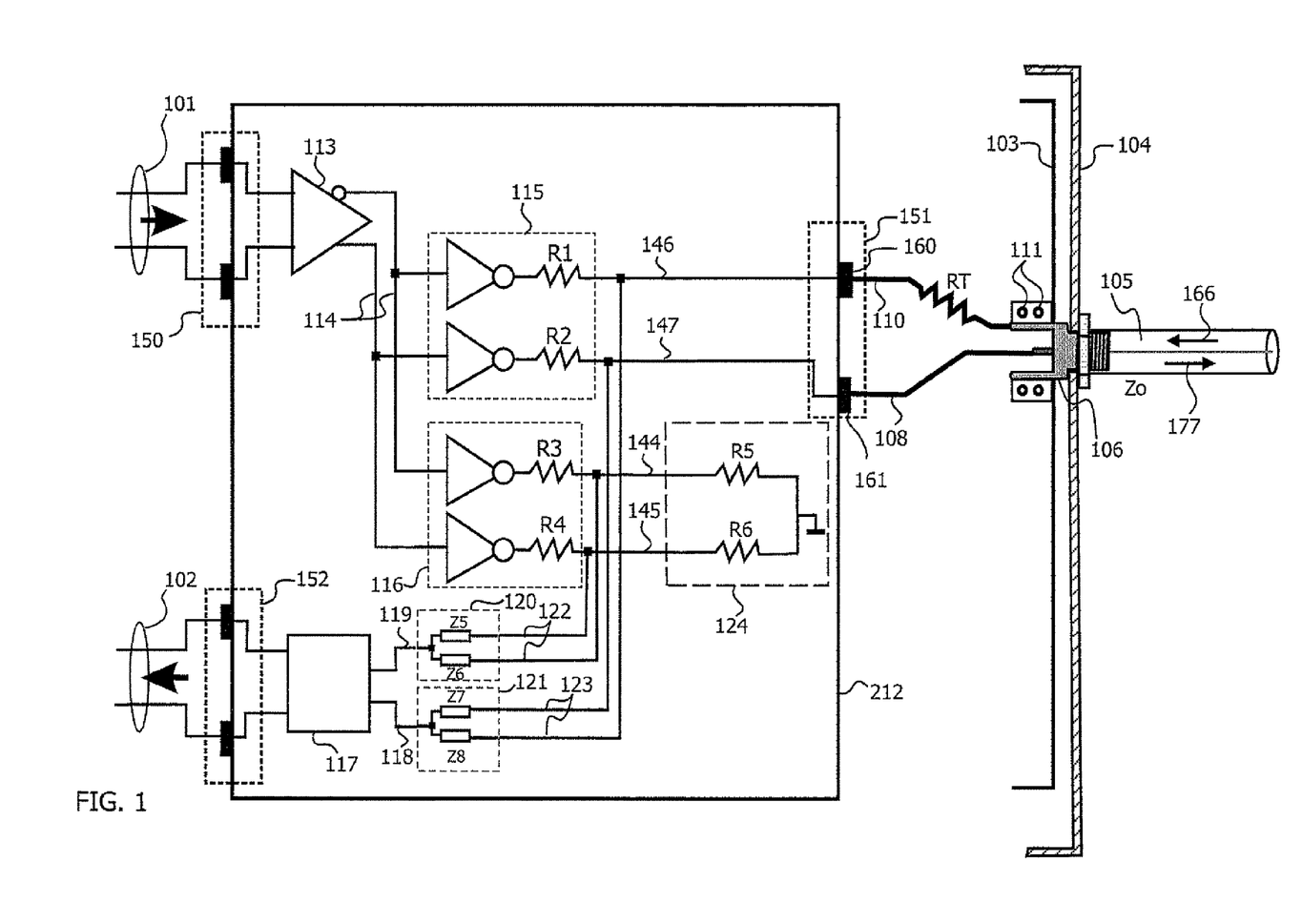
FIG. 1 illustrates an active splitter circuit according to a first embodiment of the present invention.

FIG. 1 shows a basic setup of an active splitter circuit 212 according to embodiments of the present invention.

In a first aspect, the present invention provides an active bidirectional splitter 212 for transmission and reception of data signals over a single ended transmission medium utilizing a common path for both transmission and reception. In the embodiment illustrated, the single ended common transmission channel is a coaxial cable 105. It is attached by means of a coax connector 106 onto a PCB 103. For good performance of the system, it is advantageous that the coax connector 106 is connected in a low inductive way with the main ground plane in the PCB 103. Therefore a set of vias (two vias 111 are indicated, but more may be used) may be provided at the footprint of the coax connector 106 for good connection. Further, a casing 104 of the system is preferably also connected intimately to the coax connector 106, e.g. through a nut that screws the coax connector 106 against the casing, or through any other conductive clamping means including e.g. a conductive gasket.

The active bidirectional splitter 212 comprises an input port 150, an output port 152 and a differential combined input/output port 151, a first differential output driver 115 for receiving an input signal 114 from the input port 150 and transmitting this signal to the differential input/output port 151, a second differential output driver 116 for receiving the input signal from the input port 150, a first averaging circuit 121 for averaging the differential signal at the differential input/output port 151, a second averaging circuit 120 for averaging the differential signal at the output of the second differential output driver 116, and a receiver 117 for receiving both averaged signals from the first averaging circuit 121 and the second averaging circuit 120 and for generating therefrom an output signal on the output port 152.

in a first direction (left to right in the drawings illustrated), a first transmitter (not illustrated, but at the near end of the common communication medium) couples a signal to a common communication medium, e.g. coaxial cable 105, and sends it to a second receiver (not illustrated) at the other end (far end) of the common communication medium.

In a second direction (right to left in the drawings illustrated), a second transmitter (not illustrated) at the far end (not illustrated) of the common communication medium 105 couples a signal to the common communication medium, e.g. coaxial cable 105, and sends it to a first receiver (not illustrated) at the other end, e.g. the near end illustrated in the drawings, of the common communication medium 105.

Ports 150 and 152 are hereby the unidirectional in- and output-ports respectively. In practice they will be typically implemented in a differential form, since communication over Printed Circuit Boards (PCBs) is preferably done in a differential way. They can, however, as well be of a single ended type. The illustrated embodiments show, however, the differential implementation for achieving correspondence with the most often preferred set-up.

A differential input signal 101 is received from a first transmitter (not illustrated) at a first differential port 150 and transmitted to a pre-driver 113. Pre-driver 113 shapes the differential signal on differential node 114. Differential node 114 drives a first differential output driver 115. The latter is terminated, e.g. by means of source termination resistors R1 and R2, for matching the source impedance to the characteristic impedance of first and second transmission lines 108, 110 coupled between a common input/output port 151 and the common transmission medium, e.g. coaxial cable 105. The differential signals generated by the first differential output driver 115 leave the active splitter circuit 212 via a second differential port 151 through first and second wires or transmission lines 108, 110. These first and second wires or transmission lines 108, 110 are connected by means of a coax connector 106 to the coaxial cable 105 with characteristic impedance $Z_0$. The coaxial cable 105 comprises an inner conductor, surrounded by a tubular insulating layer typically made from a flexible material, all of which is then surrounded by another conductive shield layer and then finally covered again with a thin insulating layer on the outside. The coax connector 106 has a central pin for connecting to the inner conductor of the coaxial cable 105, and one or more pins for connecting to the conductive shield layer of the coaxial cable 105. In the embodiment illustrated in FIG. 1, the first transmission line 108 is connected to the pin of the coax connector 106. The second transmission line 110 is connected to the shield of the coax connector 106. The second transmission line 110 is terminated, e.g. close to the coax connector 106, with a termination resistor RT, either to a power plane that is also connected to the shielding pin of the coax connector 106, or as shown in FIG. 1, directly to the shielding pin of coax connector 106. Resistor RT has an impedance that matches closely the characteristic impedance $Z_0$ of coaxial cable 105. In this way, second transmission line 110 is source- and end-terminated by source termination resistor R1 and termination resistor RT, respectively. First transmission line 108 is source terminated by source termination resistor R2 and continues as a transmission line through coaxial cable 105, assuming to be terminated at the far end of the coaxial cable 105 as well. The coax connector shield is preferably also connected to a power plane, preferably the GND power plane, for example though VIAs 111.

The differential signal on nodes 114 generated by the pre-driver 113 also drives a second differential output driver 116 having source termination resistors R3 and R4. Their output nodes 144 and 145 are then locally end-terminated through termination circuit 124 comprising in its simplest form two termination resistors R5 and R6. Between source-termination obtained by termination resistors R3 and R4 and end-termination obtained by termination resistors R5 and R6, it is possible to include transmission lines on-chip or off-chip. For keeping pin-count low, it is however advised not to include transmission lines at the nodes 144 and 145. This means that the termination circuit 124 can be connected directly to the output nodes 144, 145 of the source termination resistors R3, R4. Termination resistors R5 and R6 are connected to ground. In the case circuit 212 is implemented as a single chip, it is advised to connect termination resistors R5 and R6 to the PCB ground through a low inductive path.

Second differential output driver 116 and its termination 124 can optionally be downscaled versions of the first differential output driver 115 and its end-terminations. For example, a downscaling with a pre-determined factor, e.g. of 4 (downscaling factor 4) can be chosen: the W/L of all constituting transistors can be divided by the pre-determined factor, e.g. 4, resistor values of all resistors and the inductance of inductors (if present) multiplied by the pre-determined factor, e.g. four, and capacitances of all capacitors divided by the pre-determined factor, e.g. 4. Such downscaling is known by the person skilled in the art. In case of the embodiment illustrated it would favorably lower the power dissipation of the involved second differential output driver 116 by a factor related to the pre-determined factor, e.g. a factor of 4. This kind of downscaling keeps same node voltages versus time, but currents in downscaled branches get divided by the predetermined factor, e.g. 4.

Second differential output driver 116 may further be laid out in a similar way and orientation as the first differential driver 115 to achieve similar circuit behavior. In case the circuit 212 is fabricated on a single chip, the termination circuit 124 may be kept on-chip 212, advantageously lowering the external component count. For very high speed operation (in case of standard QFN packages, being frequencies above 1 GHz), however, it may be better to place the termination circuit 124 outside the chip (not shown), such that same or similar package impedances are involved as those associated with the first differential output driver 115 and such that its output signals leave the active splitter circuit chip 212 in a same or similar way. In that case it is not advised to apply aforementioned downscaling since package parasitic won't scale in the same way.

A first averaging circuit 121 will take the average voltage between nodes 146, 147. In one implementation this is achieved by two impedances Z7 and Z8, having a same impedance value and being connected in series between the two access ports of the second differential port 151. The average signal can be obtained at a node 118 between the series connected impedances Z7, Z8. The generated average voltage output is a signal on node 118, that is used as a first part of the differential input to a receiver 117.

Impedances Z7 and Z8, can for example be two resistors having a pre-determined resistance value of e.g. 1 kΩ (a value at least several times the value of the characteristic impedance $Z_0$ of coaxial cable 105, but not too large so as to avoid excessive low pass filtering due to the input capacitance of the receiver 117), or two capacitors having a pre-determined capacitance value of e.g. 300 fF (a value large enough to drive subsequent input of the receiver 117, but not too large so as to avoid loading of nodes 146 and 167 unnecessarily), or a combination of both. Equally possible is that the incoming signals are firstly source followed using two source followers or unity gain buffers, and then the average taken. The intention of the first averaging circuit 121 is to find the average signal at the start of the transmission lines 108 and 110 without constituting a too large capacitive load, or being a disturbing low resistive load to these lines.

A second averaging circuit 120, will take the average voltages of output nodes 144 and 145 of the second differential output driver. In one implementation this is achieved by two impedances Z5 and Z6, having a same impedance value and being connected in series between the two output nodes of the second differential output driver 116. The average signal can be obtained at a node 119 between the series connected impedances Z5, Z6. The generated average output is a signal on node 119, that is used as a second part of the differential input to the receiver 117.

Impedances Z5 and Z6 can best have same constitution or composition as impedances Z7 and Z8, possibly scaled by a same factor as the driver 116 was scaled. The intention of the second averaging circuit 120 is to find the average signal at the output nodes 144 and 145 of the second differential output driver 116 without constituting a too large capacitive load, or being a disturbing low resistive load to these nodes.

Receiver 117 takes the difference of the two averaged signals, so as to subtract one from the other and be left with half of the signal coming from the coaxial cable. Receiver 117 has a differential signal at its input, consisting of signals 118 and 119. A signal 166 coming from the far end of the coaxial cable 105 will arrive at node 147, via the pin of the coax connector 106 on first transmission line 108. Node 146 will not be affected much by the arrival of the signal 166. On node 118, the amplitude of this signal will thus be divided by a factor of about 2 by the first averaging circuit 121. The voltage on node 119, i.e. the average voltage at the output of the second differential driver 116 will neither be affected by the incoming wave 166. The receiver 117 has thus to be adapted using amplification means to receive the reduced signal. It will provide amplification to take care of this factor 2 attenuation, and it may also take care of the frequency depending losses that the signals have undergone by traveling through the coaxial cable 105, including possibly some losses in connectors such as coax connector 106 and PCB traces as well. The resulting signal 102 can be fed out of the receiver 117 for further use. In the case receiver 117 takes care of frequency dependent losses, receiver 117 can incorporate some kind of equalization filter. The receiver 117 can also include other circuits known to a person skilled in the art, including clock and data recovery, and quantized feedback systems for low frequency data signal recovery.

Figure 2:
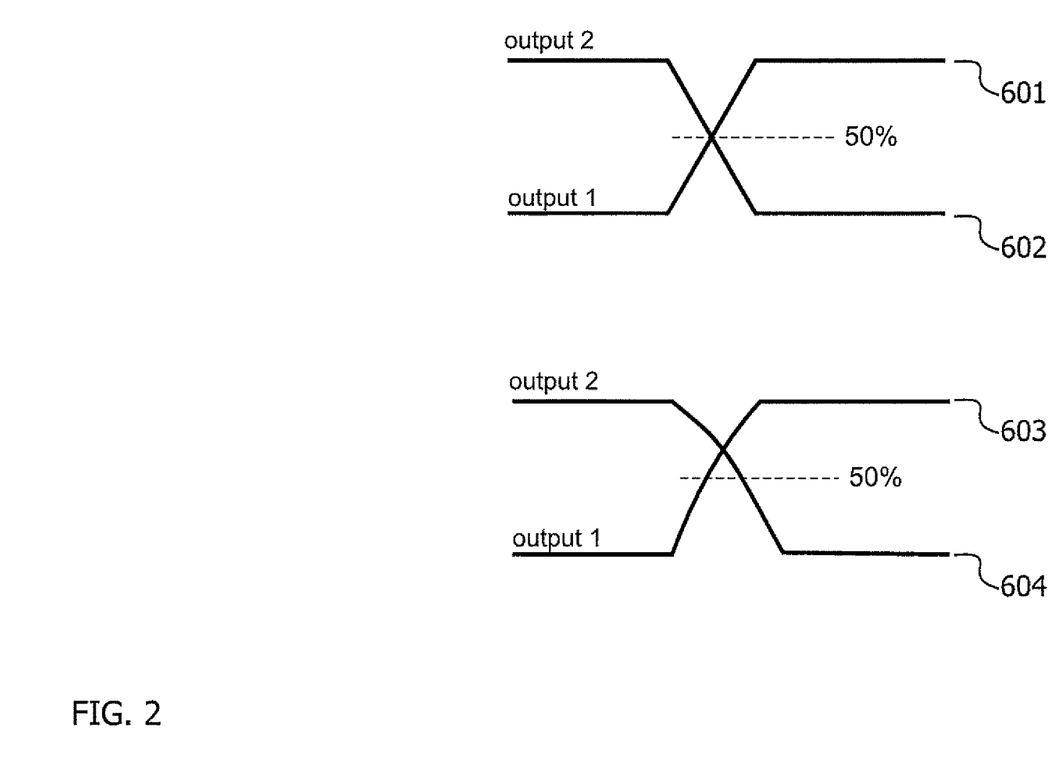
FIG. 2 shows ideal driver signals with no common mode component in the differential output on the one hand (top curves), and driver signals containing a high common mode component in the differential output on the other hand (bottom curves).

If the differential signal applied to first and second transmission lines 108, 110 would be as illustrated in the top part of FIG. 2, like the curves 601 and 602, i.e. perfectly balanced and antagonistic, opposite currents would be launched into the conductive core and the conductive shield of the coaxial cable 105. In that case, the signal in the coaxial cable would propagate without any common mode component, i.e. the ideal situation for not generating electromagnetic radiation. This can be achieved, to some extent, by generating the signals 601 and 602 as perfect as possible, i.e. with as little as possible common mode component. Also, the average signal at node 118 would then not be affected by the outbound signal.

For analogue signal transmission and for multilevel signal transmission, it is the same principle that holds: making a differential driver signal, having as little as possible common mode content. Further, it should also be noted, that the transmission lines 110 and 108 from the second differential port 151 can be kept very short, e.g. a few centimeter or lower, down to a few millimeter. Also they can carry AC coupling capacitors to AC couple the data signals (not shown). The coax connector 106 is not essential to the invention itself. The single ended-medium can be permanently connected, crimped-on, soldered and/or fixed to the position where the differential signals from transmission lines 110 and 108 are converted into single ended signaling through termination resistor RT.

Figure 5:
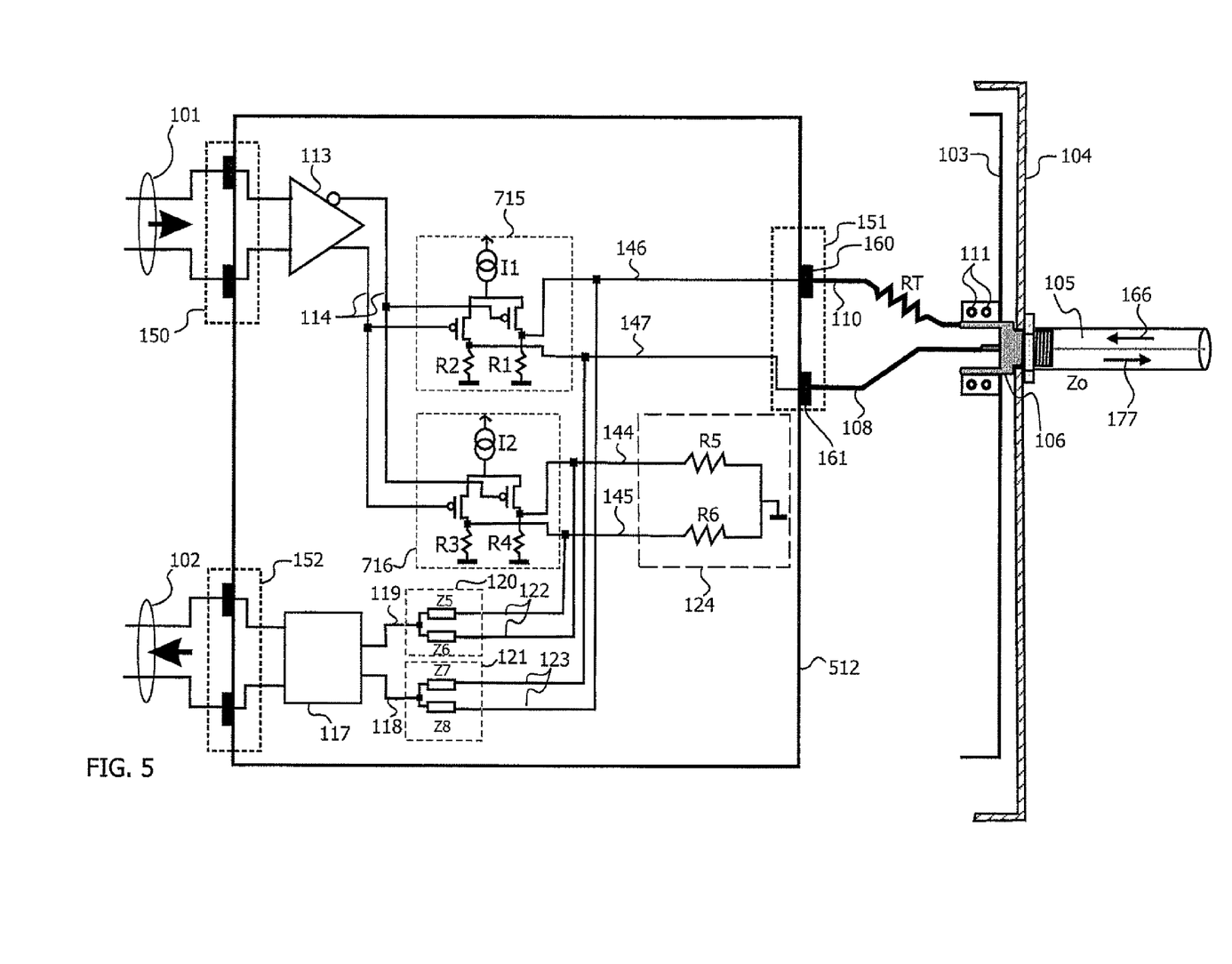
FIG. 5 illustrates an active splitter circuit according to a fourth embodiment of the present invention using differential CML drivers.

Further, in the dashed boxes indicating the output drivers 115 and 116 in FIG. 1, drivers of the inverter type are indicated. Output drivers 115 and 116 can, however, be of any type of differential output driver. As such they can also be of the CML (Current Mode Logic) driver type, or the LVDS (Low Voltage Differential Signaling) driver type. An example of an embodiment of the present invention using CML differential drivers is shown in FIG. 5 whereby output drivers 115 and 116 have been replaced by CML output drivers 715 and 716 respectively. In accordance with embodiments of the present invention, the nature of the driver must be differential, i.e. with two antagonistic outputs.

If the differential signal applied through the first and second transmission lines 108, 110 to the coax connector 106 would be as in the bottom part of FIG. 2, like the curves 603 and 604, i.e. unbalanced and not fully antagonistic, currents with a relative large common mode component would be launched into the conductive core and the conductive shield of the coaxial cable 105. This would generate some unwanted electromagnetic emissions since the coaxial cable 105 would work as antenna transmitting the common mode component with high efficiency into the outside world. Getting no common mode component in the differential output signal on the first and second transmission lines 108, 110 is quite difficult to achieve at the higher speeds, e.g. 1 Gbps or more, especially under all temperature conditions and all transistor corners. It is sufficient e.g. to have some difference between rise and fall times, and/or a little amount of duty cycle distortion to spoil the balance.

As a further result of unbalance, at each rising and falling edge of the outbound signal, a glitch will be present on the average signal on node 118 which could be regarded as unwanted crosstalk, leading to a limited splitting capacity, since signal 118 is input to the receiver 117. When the incoming single ended data signal 166 that was transmitted at the far end of a lengthy coaxial cable 105 is being received on node 118, it may show a large attenuation due to frequency dependent losses in the coaxial cable 105. The glitches present due to common mode content of the outbound signal will then disturb the good equalization and errorless reception of the signal by receiver 117. This becomes more apparent at higher bit rates, and longer cable lengths.

However, by use of the second driver 116 and its end termination 124, similar voltage glitches as are present on node 118 will be present on node 119, cancelling each other out at the input of the receiver 117, assuming that this receiver 117 is only responsive to differential signals present between its differential inputs 118, and 119. So by taking the average at the output of the second driver 116, being the signals on nodes 144 and 145, the same common mode glitch can be generated, for all transistor corners and over full temperature range. Now it becomes useful to integrate a fixed or self adaptive equalizer into receiver 117, for extending the range of allowable cable lengths of coaxial cable 105.

Further improvement of the splitting precision can be achieved by considering the possible mismatch between the impedance of the termination resistor RT at the second transmission line 110 and the characteristic impedance $Z_0$ of the coaxial cable 105. As an example only, the latter can be 47Ω, whilst the termination resistor RT can have a 51Ω value. The outbound differential signal 177 will have seen a different termination, that will show up as a common mode signal, noticeable on node 118, without being present on node 119.

Figure 3:
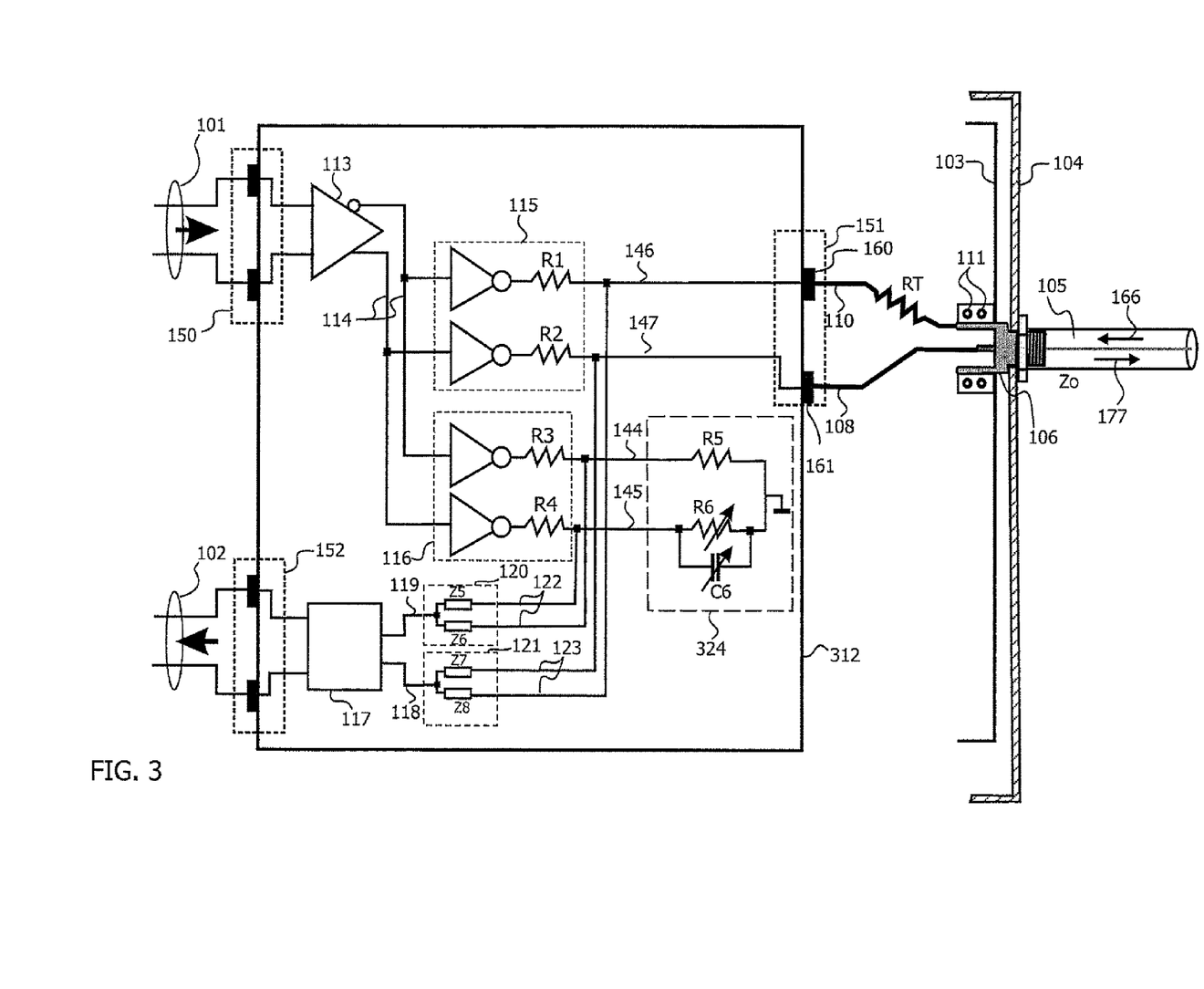
FIG. 3 illustrates an active splitter circuit according to a second embodiment of the present invention whereby a termination circuit is adapted to compensate for the imbalances at the level of the connector.

FIG. 3 shows a modified version of an active splitter circuit 312 according to embodiments of the present invention, including a modified version of a termination circuit represented by 324. It has a variable termination resistor R6. This allows to compensate for the mismatch between the impedance of the termination resistor RT on the second transmission line 110 and the characteristic impedance $Z_0$ of the coaxial cable 105. By tuning the impedance value of the variable termination resistor R6, the same signal present on node 118 due to outbound signals can be generated on node 119, such that it will be disregarded by the receiver 117. This will have no influence on the receiving properties of the signal 166 coming from the far end of the coaxial cable 105.

Similarly, a variable capacitance C6, optionally placed in parallel over the variable termination resistor R6, can take care of a capacitive imbalance at the level of the coax connector 106. It is also possible (not shown) to add a tunable capacitance in parallel with termination resistor R5 at the output node 144 of R3, allowing the full range of capacitive and/or inductive possible mismatches present at the level of the coax connector 106 to be regulated away. In order that this would work properly, the length of the first and second transmission lines or wires 108, 110 should be kept short, e.g. a few millimeters or less, down to a millimeter, requiring the active splitter circuit or chip 212 to be located very close to coax connector 106.

Figure 4:
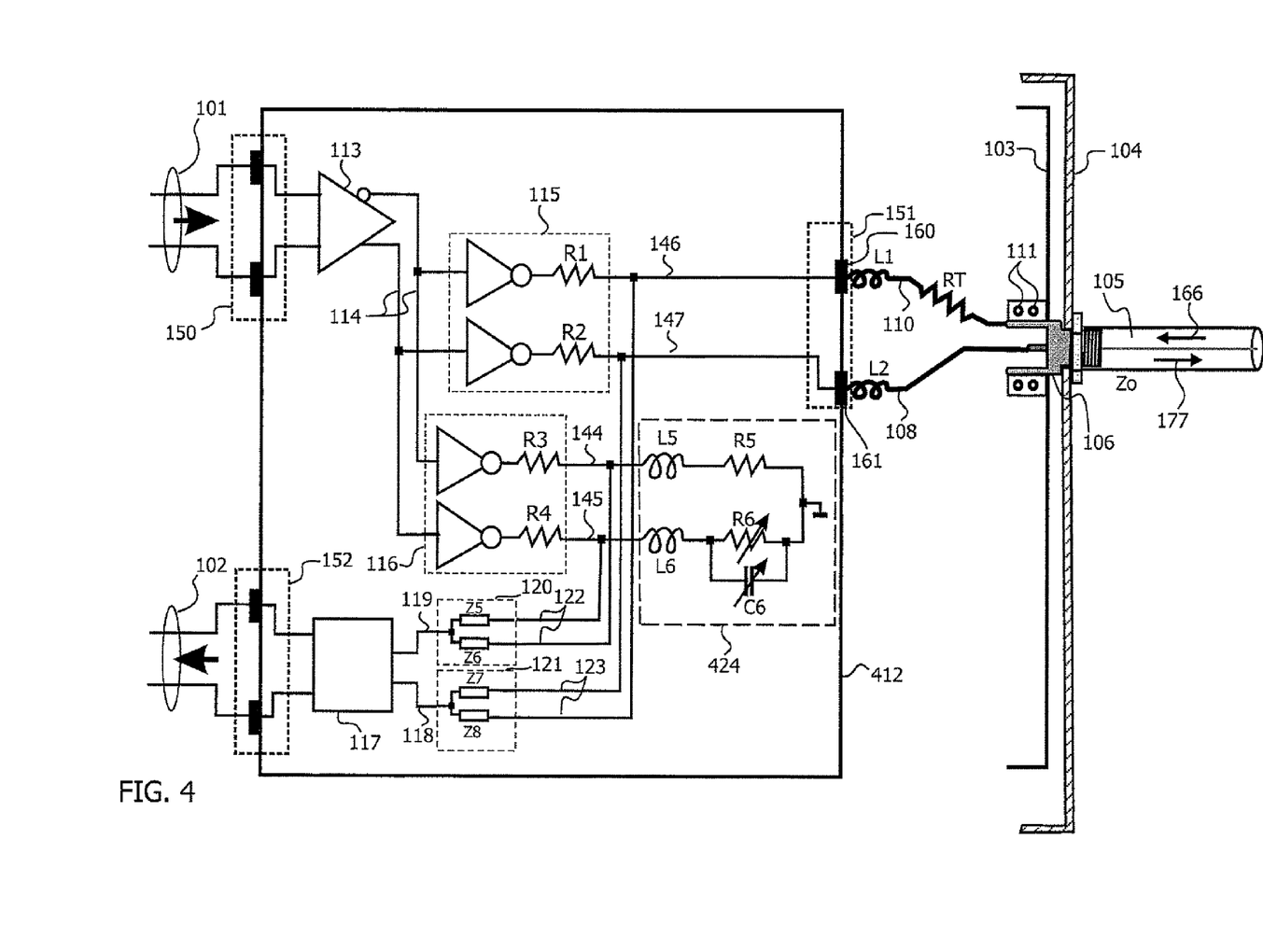
FIG. 4 illustrates an active splitter circuit according to a third embodiment of the present invention, whereby a termination circuit is adapted to compensate for the imbalances at the level of the connector further taking the chip package parasitics into account.

At very high bitrates, e.g. 1 Gbps or higher, packaging parasitics, like bond wire inductance and pin capacitance start to play a role in deteriorating the splitting functionality. FIG. 4 illustrates an active splitter circuit 412 as the active splitter circuit 212 in FIG. 1, but with a different termination circuit 424 for terminating the second differential output driver 116. FIG. 4 shows a wire bond inductance 11 between internal node 146 and first transmission line or PCB wire 110. Similarly a wire bond inductance L2 is present between internal node 147 and second transmission line or wire 108. A typical value, for a QFN (Quad Flat No Leads package) bond wire is an inductance of 1.4 nH. These inductances will modify the shape of the glitch on the signal at node 118 when having a common mode component. To generate a corresponding glitch on node 119, according to embodiments of the present invention inductors L5 and L6 can be provided in the termination circuit 424. When a downscaling by a factor of four is performed, as exemplified above, L5 and L6 should have a value of about 5.6 nH, which can easily be implemented on-chip. In FIG. 4, termination resistor R5 and variable termination resistor R6 are connected to internal GND (like in FIGS. 1 and 3). It is also possible, to connect to the external ground through extra pins, or through the exposed pad that some packages have including QFN packages, providing excellent thermal and high-frequent connection to PCB ground.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to include any specific characteristics of the features or aspects of the invention with which that terminology is associated.

The invention claimed is:

1. An active bidirectional splitter for transmission and reception of data signals over a single ended transmission medium utilizing a common path for both transmission and reception comprising
   an input port,
   an output port and
   a differential input/output port,
   a first differential output driver in operation receiving an input signal from the input port and transmitting this signal to the differential input/output port,
   a second differential output driver in operation receiving the input signal from the input port,
   a first averaging circuit in operation arranged to average the differential signal at the output of the first differential output driver,
   a second averaging circuit in operation arranged to average the differential signal at the output of the second differential output driver, and a receiver in operation receiving both averaged signals from the first averaging circuit and the second averaging circuit and generating an output signal on the output port.

2. An active bidirectional splitter according to claim 1, wherein the second differential output driver is end terminated by a termination circuit.

3. An active bidirectional splitter according to claim 2, wherein the termination circuit is configured to compensate for an impedance mismatch at the level where the single ended transmission medium is attached to the bidirectional splitter.

4. An active bidirectional splitter according to claim 3, wherein the termination circuit comprises a variable resistor.

5. An active bidirectional splitter according to claim 3, wherein the termination circuit is adapted to take care of a capacitive imbalance at the level where the single ended transmission medium is attached to the bidirectional splitter.

6. An active bidirectional splitter according to claim 5, wherein the end termination circuit comprises a variable capacitor.

7. An active bidirectional splitter according to claim 2, wherein the end termination circuit is configured to compensate for packaging parasitics.

8. An active bidirectional splitter according to claim 7, wherein the end termination circuit comprises at least one inductance.

9. An active bidirectional splitter according to claim 2, wherein the end termination circuit is implemented on a chip with the active bidirectional splitter.

10. An active bidirectional splitter according to claim 1, wherein the differential input/output port has a first connection and a second connection, the first connection being terminated to a shield of the single ended transmission medium through a termination resistor, and the second connection being connected to an inner core of the single ended transmission medium.

11. An active bidirectional splitter according to claim 1, wherein the second differential output driver is a downscaled version of the first differential output driver.

12. An active bidirectional splitter according to claim 11, the first differential output driver and the second differential output driver being terminated, wherein the termination of the second differential output driver is a downscaled version of the end termination of the first differential output driver.

13. An active bidirectional splitter according to claim 1, wherein the first averaging circuit and/or the second averaging circuit comprises two impedances having a same impedance value and being connected in series, the average being obtained at a node between the two impedances.

14. A method for active bidirectional splitting of data signals transmitted and received over a common single ended transmission medium, the method comprising
receiving at a first differential output driver a differential input signal and transmitting this signal to a differential input/output port,
receiving at a second differential output driver the differential input signal,
receiving at a differential input/output port a data signal transmitted over the common single ended transmission medium,
averaging the differential signal at the differential input/output port,
averaging the differential signal at the output of the second differential output driver, and
receiving both averaged signals and therefrom generating a differential output signal on a differential output port.

15. A method according to claim 14, furthermore comprising end terminating the second differential output driver.

* * * * *